(No Model.) 2 Sheets—Sheet 1.
G. W. KIRKPATRICK & E. J. CORSER.
GRAIN DRILL.
No. 446,636. Patented Feb. 17, 1891.
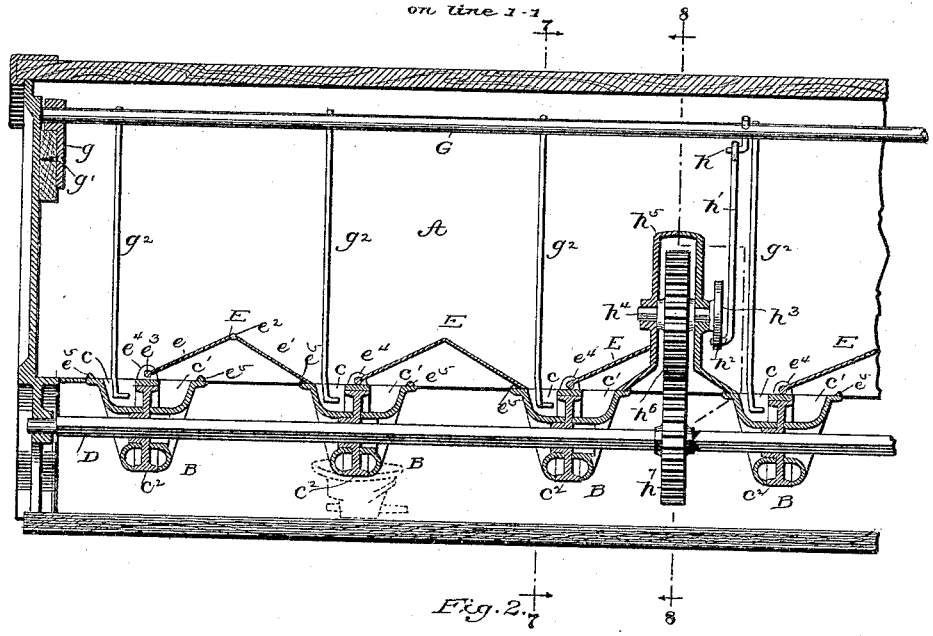
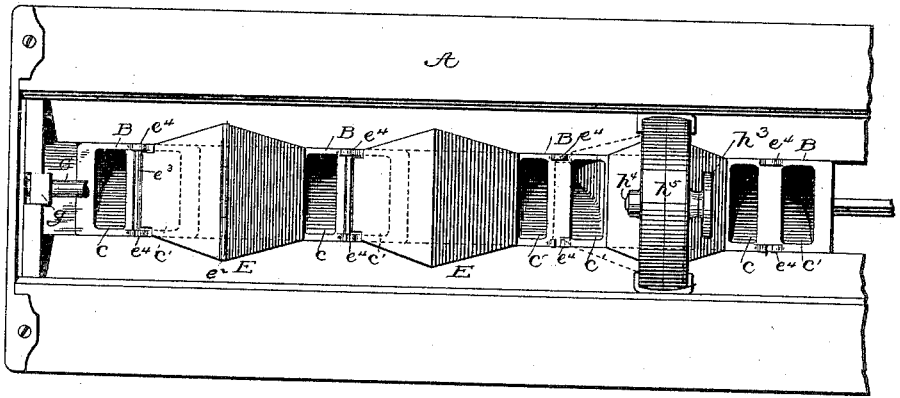
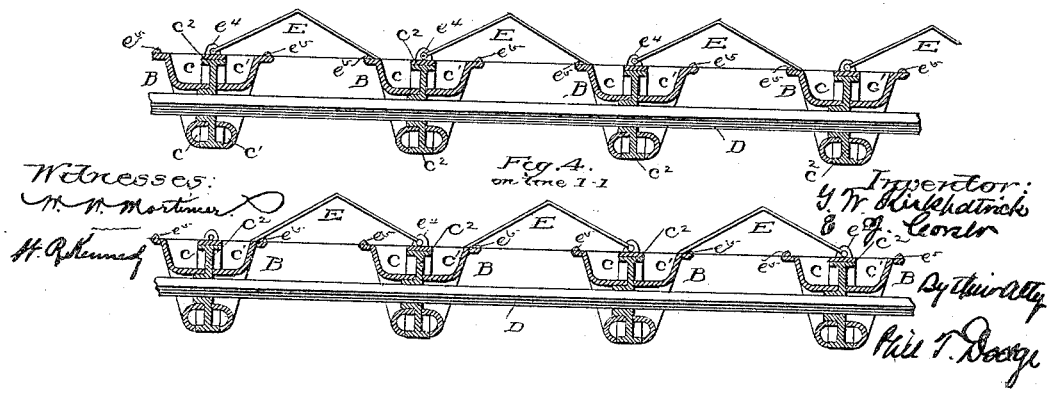

(No Model.) 2 Sheets—Sheet 2.
G. W. KIRKPATRICK & E. J. CORSER.
GRAIN DRILL.
No. 446,636. Patented Feb. 17, 1891.
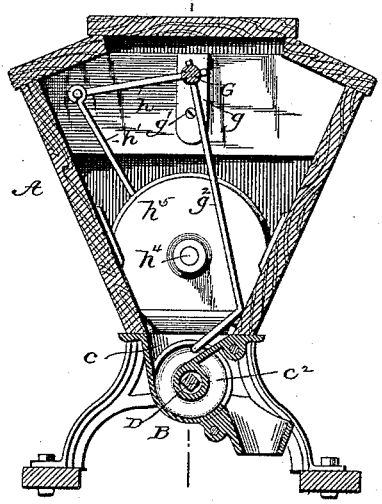
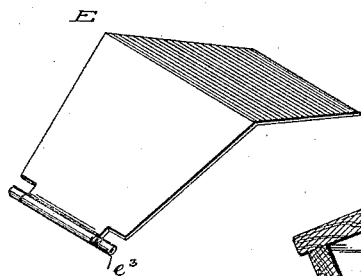
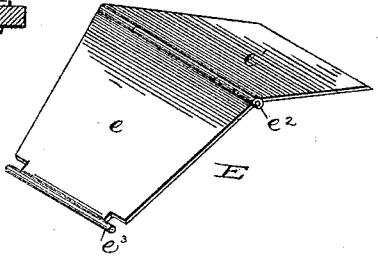
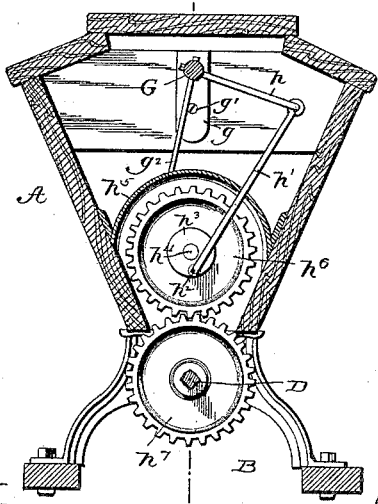
Witnesses:
Inventor:
Geo. W. Kirkpatrick
Edw. J. Corser
By Phil T. Dodge
Atty

UNITED STATES PATENT OFFICE.

GEORGE W. KIRKPATRICK AND EDSON JAY CORSER, OF MACEDON, NEW YORK.

GRAIN-DRILL.

SPECIFICATION forming part of Letters Patent No. 446,636, dated February 17, 1891.

Application filed July 23, 1890. Serial No. 359,644. (No model.)

*To all whom it may concern:*

Be it known that we, GEORGE W. KIRKPATRICK and EDSON JAY CORSER, of Macedon, in the county of Wayne and State of New York, have invented certain Improvements in Grain-Drills, of which the following is a specification.

Our invention relates to that class of force-feeds in which vertical wheels mounted in cups or cases at the bottom of a hopper are provided with annular side channels through which the grain is carried and delivered from the cups in continuous streams.

The first part of the invention relates particularly to those duplex feeders such as shown in the Bickford patent, No. 63,001, May 19, 1867, in which each feed-wheel is provided in its opposite sides with two channels differing in form or size, so that by closing the inlet to one or the other of the channels the device may be adapted for feeding different kinds of seed or the same seed at different rates of speed.

Heretofore it has been customary to provide the hopper-bottom with inclined wooden blocks to direct the seed into the feed-cups and with slides or other valves to close the sides of the cup alternately. These devices will not in all cases cause the grain to flow steadily into the cup, and in the feeding of bearded oats great difficulty is experienced. To avoid this trouble we employ in the bottom of the hopper above the feed-cups reversible metal plates, which serve to close the cups on one side and also to present smooth inclined surfaces to direct the grain into the cups. These plates, which form in effect secondary hoppers or conductors in the bottom of the main hopper, may be solid or jointed and hinged or otherwise attached in any appropriate manner.

The second part of the invention is directed to the uniform delivery of bearded oats and other grains which do not flow freely into the cups, and consists in vibrating agitators constructed and arranged in the peculiar manner hereinafter explained.

In the accompanying drawings, Figure 1 is a longitudinal vertical section through a hopper and feed devices with our improvements applied thereto on the line 1 1 of Figs. 7 and 8. Fig. 2 is a top plan view of the same with the agitator removed. Figs. 3 and 4 are longitudinal vertical sections on the same line as Fig. 1, showing the reversible bottom plates or wickets in their different positions. Figs. 5 and 6 are perspective views showing the wickets in different forms. Figs. 7 and 8 are vertical cross-sections on the lines 7 7 and 8 8, Fig. 1, respectively, looking in the direction indicated by the arrows.

In the drawings, A represents the hopper, consisting of the converging side walls and the end plates connecting them. It may be and usually is made, as shown, without the bottom heretofore employed.

B B are the duplex seed cups or distributers, constructed in the usual manner and secured to the lower edges of the hopper, each cup presenting at the top two inlet-mouths $c\ c'$, leading to opposite sides of the contained wheel $c^2$. A shaft D extends through and imparts motion to all the wheels.

The foregoing parts are constructed and operate as usual.

E E are the plates or wickets to which our invention relates. They are made of smooth sheet metal and hinged or jointed to the feed-cups between the two mouths. Each plate extends from the center of one cup to the adjacent side of the next cup, and by so doing it serves not only to cover and render inoperative one side of the cup to which it is attached but also to bridge over and close that portion of the hopper lying between the cups. The plate rises from its two ends toward its middle, and fits at its edges closely against the inner walls of the hopper, so that it serves not only as a part of the hopper-bottom to prevent the leakage of grain, but also as a chute or conductor to direct the grain into the cups. Each plate is reversible from right to left, and vice versa, so that it may be extended in either direction from its point of attachment and thus caused to close one side or the other of the cup, as represented in Figs. 3 and 4. The reversibility may be secured by forming the plate, as shown in Fig. 5, of two parts $e\ e'$, united by a hinge $e^2$ at the center, so that the plate may be turned over on its hinge $e^3$ at the end and then bent or flexed on the central hinge, as its position to the right or left may demand. The central hinge may, however, be omitted and the plate formed in one piece, bent as shown in Fig. 6, in which case its reversal is effected by disconnecting it from the cup and turning it end for end without inverting it. In this form the plate has its journals flattened, so that they may be slipped vertically through narrow slots into the ears $e^4$ in the seed-cup, and then secured by turning the plate down in place.

In order to insure a tight joint and prevent the leakage of grain, the feed-cups are preferably provided with upwardly-turned lips or flanges $e^5$, overlapped by the wickets, as shown.

Passing now to the agitator, G represents a horizontal rock-shaft located longitudinally in the top of the hopper and sustained at its ends in bearing-plates $g$, secured to the hopper by screw $g'$, so that they may be readily disconnected to permit the removal of the shaft.

The shaft is provided with a series of arms or fingers $g^2$, preferably of stout wire, which are extended down through the hopper and into the mouths of the respective feed-cups. Each finger is preferably curved transversely of the hopper at its lower end and then bent laterally, so as to reach within the channel of the feed-wheel.

The rock-shaft is provided with a lateral arm $h$, connected by pitman $h'$ to a crank-pin $h^2$, carried by a disk $h^3$ on the end of a horizontal shaft $h^4$. This shaft is sustained at its end in a hollow shell or casing $h^5$, bolted to the interior of the hopper and containing a pinion $h^6$, which engages and receives motion from a pinion $h^7$ on the shaft of the feed-wheels. The devices named communicate to the shaft a rocking motion, causing the arms $g^2$ to vibrate transversely of the hopper. Thus vibrating they serve not only to loosen the mass of grain in the hopper that it may descend by gravity toward the seed-cups, but also to loosen and distribute the seed in the feed-cup that it may be uniformly delivered by the wheels.

While we prefer to employ the devices shown for imparting motion to the shaft G, it may be driven by any equivalent mechanism.

We do not claim, broadly, an agitator-finger which vibrates within a seed cup or run. It is to be observed that our device vibrates in a substantially horizontal path, that it extends down within the cup past the side of the feed-wheel, and that its end is projected laterally toward the wheel. In consequence of these peculiarities in form and movement the finger is found to be peculiarly efficient in dislodging, loosening, and facilitating the flow of the so-called "bearded oats," which are found in practice to knit together in a firm mass, which cannot be loosened by ordinary devices.

Having thus described our invention, what we claim is—

1. In combination with the seed-hopper and the feed cups and wheels thereunder, the rock-shaft mounted in the hopper directly over the cups and provided with arms extending downward into the cups adjacent to the wheels, whereby their ends are given a substantially horizontal position within the cups.

2. In combination with the hopper, feed-cups, and feed-wheels, the elevated rock-shaft and its depending fingers having their ends projected downward into the feed-cups and bent laterally toward the feed-wheels, whereby they are adapted the better to dislodge the grains and cause the delivery of the same into the wheels.

3. In combination with the hopper, the feed-cups, the feed-wheels, and the rotary shaft carrying seed-wheels, the elevated rock-shaft provided with depending arms $g^2$ and arm $h$, the crank-wheel and pitman for operating said shaft, the two gears connecting the same with the feeder-shaft, and the housing or casing $h^5$, located within the hopper and inclosing the gear, as shown.

4. In combination with a hopper and a series of duplex feeders, substantially as shown, a series of reversible plates or wickets, substantially as shown, each covering one side of a feeder and the space between said feeder and the next, whereby the wickets are adapted to render either side of the feeders inactive at will and also to conduct the grain directly into the operative side.

5. In combination with a hopper having inclined sides, and the series of duplex feed-cups thereunder, the metallic reversible wickets jointed to the feed-cups and extending each from the center of one cup to the side of the next, said wickets elevated at the middle and fitting at the edges against the hopper-walls.

6. A wicket for use in grain-drills, consisting of the two leaves formed and jointed together, substantially as shown.

In testimony whereof we hereunto set our hands, this 10th day of July, 1890, in the presence of two attesting witnesses.

GEORGE W. KIRKPATRICK.
EDSON JAY CORSER.

Witnesses:
A. W. GATES,
E. W. GRIDLEY.